(12) United States Patent
Barton et al.

(10) Patent No.: US 11,210,623 B2
(45) Date of Patent: Dec. 28, 2021

(54) AUTHENTICATION SYSTEM FOR PURCHASE DELIVERY

(71) Applicant: BARCLAYS EXECUTION SERVICES LIMITED, London (GB)

(72) Inventors: Loren Barton, London (GB); Colin McSkeane, Toddington (GB)

(73) Assignee: Barclays Execution Services Limited, London (GB)

( * ) Notice: Subject to any disclaimer, the term of this patent is extended or adjusted under 35 U.S.C. 154(b) by 521 days.

(21) Appl. No.: 14/888,345

(22) PCT Filed: May 1, 2014

(86) PCT No.: PCT/GB2014/051357
§ 371 (c)(1),
(2) Date: Oct. 30, 2015

(87) PCT Pub. No.: WO2014/177877
PCT Pub. Date: Nov. 6, 2014

(65) Prior Publication Data
US 2016/0078397 A1    Mar. 17, 2016

(30) Foreign Application Priority Data
May 1, 2013   (GB) ..................... 1307841

(51) Int. Cl.
*G06Q 20/00*       (2012.01)
*G06Q 10/08*       (2012.01)
(Continued)

(52) U.S. Cl.
CPC ....... *G06Q 10/083* (2013.01); *G06Q 10/0832* (2013.01); *G06Q 20/322* (2013.01);
(Continued)

(58) Field of Classification Search
None
See application file for complete search history.

(56) References Cited

U.S. PATENT DOCUMENTS

2003/0144968 A1   7/2003  Katayama et al.
2008/0195499 A1*  8/2008  Meredith ............... G06Q 20/06
                                                           705/26.3
(Continued)

FOREIGN PATENT DOCUMENTS

GB          2431549 A       4/2007
GB          2455812 A       6/2009
(Continued)

OTHER PUBLICATIONS

International Preliminary Report on Patentability in International Application No. PCT/GB2014/051357 dated Nov. 3, 2015 (5 pages).
(Continued)

*Primary Examiner* — Dante Ravetti
(74) *Attorney, Agent, or Firm* — Foley & Lardner LLP

(57) ABSTRACT

A computer-implemented method of providing authenticated delivery of a purchase to an authorised recipient comprises: a. authorising (S2-1) a purchase, including designating an authorised recipient for the purchase; b. providing (S2-3) corresponding delivery tokens (4a, 4b) to a recipient device (3) of the authorised recipient and to a delivery device (13) associated with delivery of the purchase; c. at the point of delivery, determining (S2-7) whether the delivery token (4a) of the recipient device (3) matches the delivery token (4b) of the delivery device (13); and, if so: d. confirming (S2-9) that delivery of the purchase is authorised.

13 Claims, 5 Drawing Sheets

(51) Int. Cl.
*G06Q 20/32* (2012.01)
*G06Q 20/36* (2012.01)
*G06Q 20/38* (2012.01)
*G06Q 20/40* (2012.01)

(52) U.S. Cl.
CPC ......... *G06Q 20/36* (2013.01); *G06Q 20/3674* (2013.01); *G06Q 20/382* (2013.01); *G06Q 20/401* (2013.01)

(56) References Cited

U.S. PATENT DOCUMENTS

| | | | | |
|---|---|---|---|---|
| 2012/0150669 A1* | 6/2012 | Langley | ............. | G06Q 30/0601 |
| | | | | 705/16 |
| 2012/0209749 A1* | 8/2012 | Hammad | ............... | G06Q 30/06 |
| | | | | 705/27.1 |
| 2012/0265684 A1* | 10/2012 | Singh | .................. | G06Q 20/027 |
| | | | | 705/44 |
| 2012/0303503 A1* | 11/2012 | Cambridge | ........... | H04L 9/3234 |
| | | | | 705/35 |
| 2012/0330824 A1* | 12/2012 | Ng | ....................... | G06Q 20/385 |
| | | | | 705/39 |
| 2013/0246259 A1* | 9/2013 | Dessert | ................ | G06Q 20/367 |
| | | | | 705/41 |

FOREIGN PATENT DOCUMENTS

| | | |
|---|---|---|
| JP | 2004331329 A | 11/2004 |
| WO | 2009081149 A1 | 7/2009 |
| WO | 2010148636 A1 | 12/2010 |
| WO | WO-2012/042262 A1 | 4/2012 |

OTHER PUBLICATIONS

International Search Report and Written Opinion in International Application No. PCT/GB2014/051357 (6 pages).

* cited by examiner

000
AUTHENTICATION SYSTEM FOR PURCHASE DELIVERY

FIELD OF THE INVENTION

This invention relates to a method and system for authenticating delivery of purchases, such as online or mobile purchases.

BACKGROUND OF THE INVENTION

In conventional methods of online payment for goods to be delivered, a delivery address for the goods is provided by the purchaser or retrieved from a purchaser record. However, there is no reliable way of confirming that the goods have been delivered to the intended recipient. The person delivering the goods may require a signature from the recipient, but has no means of verifying that the person signing for receipt of the goods is authorised to receive the goods. For example, the goods may be left with a neighbour or signed for by a person at the delivery address who is not the intended recipient; this may lead to disputes or fraud.

In one conventional method, the delivery person carries a mobile device having a touch-sensitive screen on which the recipient signs to confirm receipt of the goods. The mobile device may also be used to scan a label on the packaging to identify the delivery item. This is partially effective against repudiation, where the intended recipient denies having received the goods, but does not prevent delivery to the wrong person.

Typically, the payment company through which payment for the goods was made is liable for non-delivery of goods, so it would be desirable for the payment company to be able to verify that the goods had been delivered to the intended recipient.

Patent publication US-A-2003/0144968 (Katayama et. al.) discloses a logistic PKI service system, in which a user uses a mobile terminal to purchase an article from an online store, which in turn requests distribution label data from an authentication bureau. The distribution label data is printed on a distribution label for the article, and corresponding authentication information is sent to the user's mobile terminal. On delivery of the article, the user scans the distribution label data and uses the corresponding authentication information to verify information about the delivery. The user's mobile terminal may send a message to a mobile terminal of a party requesting the delivery, for example to confirm receipt. However, this system does not allow the delivery person to verify that the person receiving the delivery is the intended recipient.

STATEMENT OF THE INVENTION

Different aspects of the present invention are defined in the independent claims.

In an embodiment of the invention, a customer makes a purchase through their digital wallet. Payment information and address information is stored in the digital wallet and transferred to a retailer's digital wallet acceptance site for payment.

A delivery token is generated and sent to:
  The retailer's digital wallet interface corresponding to the customer, address and purchase information
  The consumer's digital wallet; and
  A digital wallet logistics mobile application used by the logistics or delivery company.

When the package is delivered to the end customer, the logistics token and the consumer token are matched through corresponding mobile devices to confirm receipt. If the package is delivered to a neighbour, the token can be shared with that neighbour and matched by the logistics mobile application. If the tokens match, a confirmation message may be sent from the payments issuer or retailer to the consumer.

Access to the delivery token may be restricted to an authenticated user of the digital wallet, thus providing greater security. Advantageously, the method may secure both the point of transaction and the point of delivery, preferably by means of a digital wallet.

In other aspects, there is provided a system comprising means for carrying out the methods as described above. In another aspect, there is provided a computer program arranged to carry out the method when executed by suitable programmable devices.

BRIEF DESCRIPTION OF THE DRAWINGS

There now follows, by way of example only, a detailed description of embodiments of the present invention, with references to the figures identified below.

DETAILED DESCRIPTION OF THE EMBODIMENTS

Technical Architecture

Figure 1:
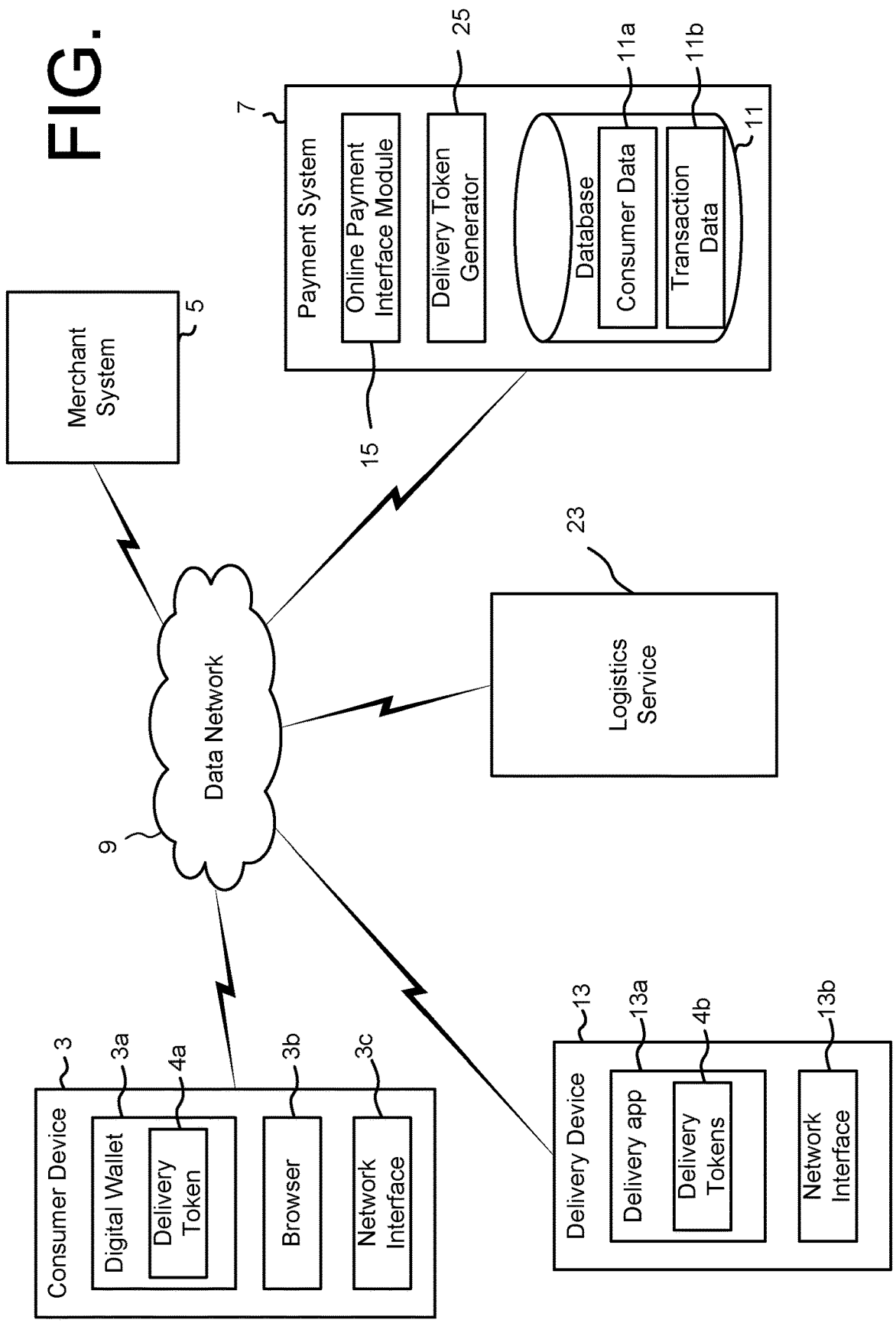
FIG. 1 is a schematic block diagram illustrating the main components of a system for online purchase and delivery according to an embodiment of the invention.

Referring to FIG. 1, an online purchase and delivery authentication system according to embodiments of the invention comprises a consumer device 3 associated with a consumer wishing to effect a payment transaction for purchase of a product or service provided by a merchant, via a payment system 7 associated with an intermediary payment service provider. The consumer device 3 is connected or connectable to a merchant system 5 associated with the merchant over a data network 9. The consumer device 3 and the merchant system 5 are also connected or connectable to the payment system 7 over the data network 9.

It will be appreciated that the consumer can be interchangeably referred to as a customer, user, end user or the like, the merchant can be interchangeably referred to as a retailer, vendor, business, broker, service provider or the like, and the intermediary payment service provider can be interchangeably referred to as a payment service provider, payment issuer or the like.

The consumer device 3 is preferably a mobile or portable device such as a tablet computer, a smartphone, a 'feature' phone, a personal digital assistant (PDA), or any processor-powered device with suitable input and display means. The device 3 may be a terminal of the network 9. Alternatively, the consumer device may be a desktop or laptop computer.

The data network 9 may comprise a one or more of: a terrestrial cellular network such as a 2G, 3G or 4G network, a private or public wireless network such as a WiFi™-based network and/or a mobile satellite network, or the Internet. It will be appreciated that a plurality of, and preferably a large number of consumer devices 3 and merchant systems 5 are operable concurrently within the system.

The consumer device 3 has a browser application 3b, or a dedicated application, for accessing and interacting with an online store hosted by the merchant system 5 and connected to the network 9. The online store displays items that a consumer may select for purchase, and stores the selected item(s) selected by the consumer during a session in a 'basket' or other model representing a set of items selected for purchase.

The merchant system 5 may comprise multiple components (not shown), such as a web server for serving web pages to the consumer's browser application 3b and a backend server for storing data representing consumers and baskets, and interfacing with payment systems, such as the payment system 7. The consumer device 3 may be a client of the merchant system 5, although embodiments of the invention may not be limited to a client-server model.

The payment system 7 interacts with a digital wallet 3a on the consumer device 3 to authorise and process payments by interaction with an authenticated user of the consumer device 3. The payment system 7 has access to one or more database(s) 11 including consumer data 11a relating to subscribers or registered users of the payment service provider. The database 11 may also include transaction data 11b relating to specific payment sessions, for example. The consumer data 11a may include one of more delivery addresses associated with the consumer, which are provided to the merchant system 5 so that the user may select a delivery address for a purchase. Alternatively, the consumer may provide the delivery address to the merchant system 5.

Mobile payment systems are generally well known, in which a consumer device is configured to provide payment from a digital wallet that is issued by a payment service provider. Typically, the consumer device is configured with mobile wallet hardware and software to enable data communication with the payment service provider's backend system over a data network, to complete a mobile wallet-based transaction with the mobile wallet. General examples of such mobile payment systems can be found in the Applicant's earlier applications, such as WO 2012/042262.

In the exemplary embodiment illustrated in FIG. 1, the digital wallet 3a of the consumer device 3 accesses and interacts with an online payment interface module 15 hosted by the payment system 7 to provide credentials for authorising payment. The online payment interface module 15 may interact with the digital wallet 3a to authorise payment from an account of the consumer. The digital wallet 3a may store credentials associated with one or more pre-stored value accounts or bank accounts from which payment may be authorised.

The payment system 7 may be connected to, or may comprise a payment fulfilment service (not shown) of a type that is known per se, which executes the requested payments between specified consumer and merchant accounts. The consumer and merchant accounts may be maintained by the payment system 7 and/or conventional third party financial system(s), such as a bank card issuer, a merchant acquirer, a financial institution, a business entity or the like. Preferably, although not necessarily, the payment system 7 is associated with a payment account issuer that maintains at least one designated financial account and/or stored value account for the consumer.

In an embodiment of the invention, the payment system 7 generates a secure delivery token, or a pair of corresponding delivery tokens, when a payment is authorised and executed. The delivery token(s) may comprise data uniquely or near-uniquely identifying the transaction for which payment is authorised; the data may comprise one or more of: a one-time random or pseudo-random code, a delivery address, a merchant identifier, a customer identifier, a date and/or time of the transaction etc. The delivery token(s) may be signed with a public key associated with the payment system 7.

The payment system 7 sends the generated delivery token(s) 4a, 4b to the consumer's digital wallet 3a and to the merchant system 5. The merchant system 5, which is responsible for instructing a logistics service 23 to deliver the goods paid for in the transaction, routes the delivery token 4b to the logistics service 23 which in turn provides the delivery token 4b to a delivery device 13 for use by the delivery person responsible for delivering the goods. Alternatively, the selection of the logistics service 23, and/or the routing of the delivery token 4b, may be performed by the payment service.

The delivery device 13 may be a mobile or portable device such as, a tablet computer, a smartphone, a 'feature' phone, a personal digital assistant (PDA), or any processor-powered device with suitable input and display means. The delivery device 13 may be a custom device designed specifically for delivery authentication purposes, and may also include conventional functionality for scanning a delivery label and/or receiving a recipient signature as input.

The delivery device 13 executes or accesses a delivery application or 'app' 13a that stores delivery tokens 4b provided by the logistics service 23 and implements a delivery authentication process as described below. The delivery application 13a may comprise a digital wallet for storage of the delivery tokens 4b, although the delivery device 13 need not be able to authorise payments.

The delivery device 13 may include a network interface 13b for connection to the data network, although connection to the logistics service 23 may be by other means, such as a local connection to the logistics service 23 when the delivery person returns from delivery.

Delivery Authentication Process

Figure 2:
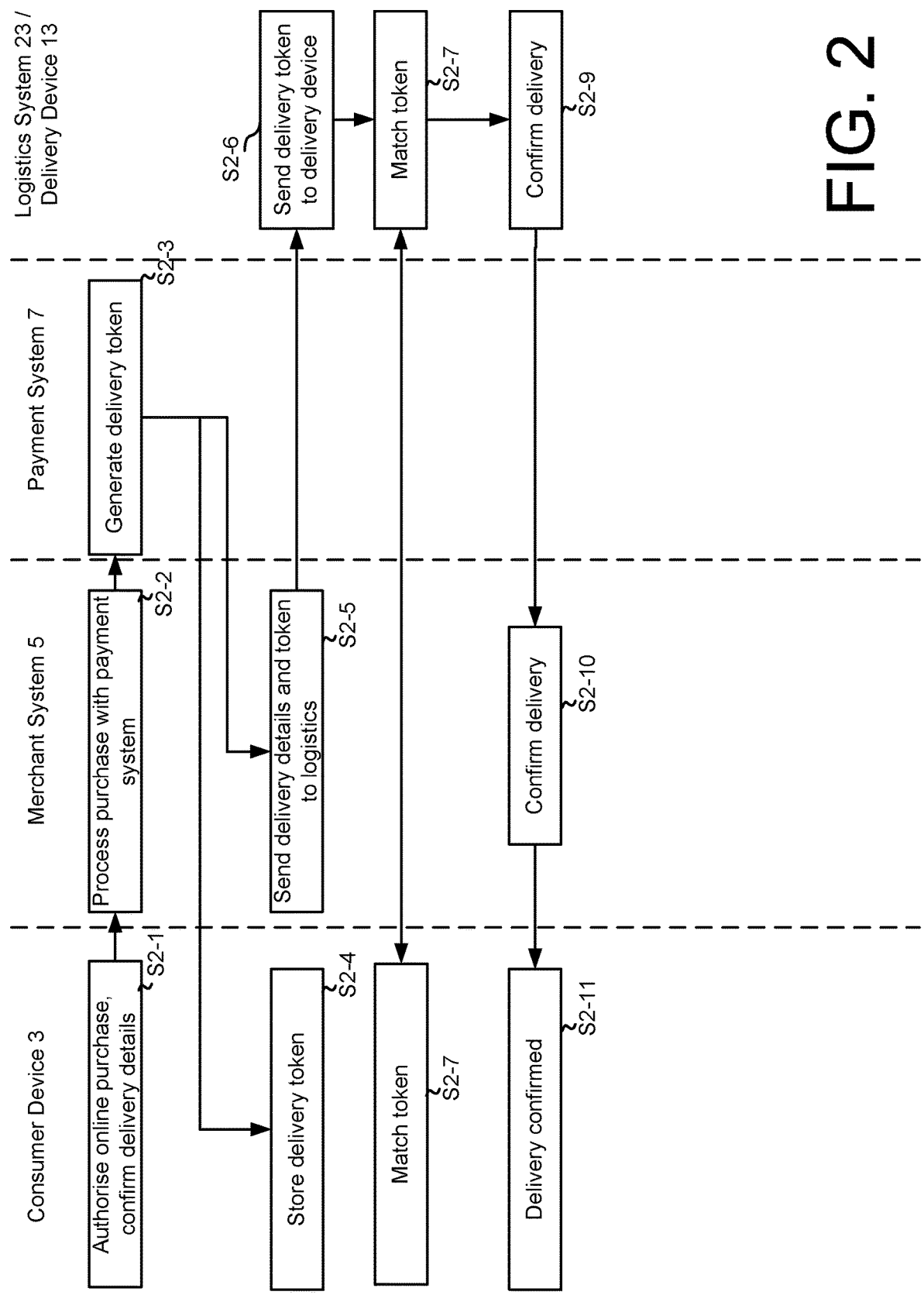
FIG. 2 is a flow diagram of the operation of the components of the system in the embodiment.

A brief description has been given above of the main components forming part of the delivery authentication system of an exemplary embodiment. A more detailed description of the operation of these components will now be given with reference to the flow diagram of FIG. 2.

The process begins at step S2-1 where the consumer authorises an online purchase with the merchant system 5, for example using the digital wallet 3a, and the merchant system 5 processes the purchase with the payment system 7 at step S2-2, as described above. As part of the payment authorisation process, or as a separate step, the consumer uses the consumer device 3 to confirm delivery details for the purchased goods to the merchant system 5. The delivery details may be provided as pre-stored information from the digital wallet 3a, from the payment system 7 or from the merchant system 5, for example where the consumer has registered an account with the merchant system 5. Alternatively, the consumer may manually enter the delivery details at the consumer device 3. The consumer may manually select an option, presented for example by the merchant system 5, to verify the delivery of the purchased goods as will be further described below. Alternatively, this option may be selected automatically.

The payment system 7 may securely connect to the digital wallet 3a during the purchase so as to verify the identity of the delivery recipient independently of the information provided to the merchant system 5.

In one alternative to step S2-1 and S2-2, the purchase may be made at a merchant's point of sale (POS), for example using the digital wallet 3a. In other words, it is not essential that the purchase is made between the consumer device 3 and the merchant system over a network, such as the data network 9. Hence, the digital wallet 3a may be a multi-channel digital wallet enabling both online and POS payments.

At step S2-3, the payment system 7 generates the delivery token(s) as described above, and sends the delivery token 4a, 4b to the consumer device 3 and to the merchant system 5. At step 2-4, the consumer device 3 stores the delivery token 4a in the digital wallet 3a.

At step S2-5, the merchant system 5 sends the delivery details and the delivery token (4b) to the logistics system 23, for delivery of the purchased goods. At step S2-6, the logistics system 23 provides the delivery token 4b to the delivery device 13 of the delivery person responsible for delivering the purchased goods. The goods are then sent for delivery by that person, accompanied by the delivery device 13 having the delivery token 4b.

At step S2-7, at the point of delivery, the delivery token 4b stored on the delivery device 13 is matched with the delivery token 4a stored in the digital wallet 3a of the consumer device 3, as will be described in more detail below. If the tokens 4a, 4b match, the delivery person delivers the goods to the consumer and the delivery device 13 records that the delivery tokens 4a, 4b were matched and communicates this to the logistics system 23. The message may also be sent to the payment system 7, for example so as to update the status of the delivery token(s) 4a, 4b as redeemed and to prevent their re-use.

At step 2-9, the logistics system 23 receives confirmation that the tokens 4a, 4b were matched and sends a message to the merchant system 5 confirming delivery. At step S2-10, the merchant system 5 sends a message to the consumer device 3 that the delivery is confirmed, which may be displayed or otherwise indicated at step S2-11.

The process has been described above with reference to the delivery of goods, but is applicable to other types of physical delivery, such as the delivery of services; in that case, the person providing the service instead of the delivery person may verify that the recipient is the intended recipient of the service, before providing the service.

Token Matching Process

Figure 3:
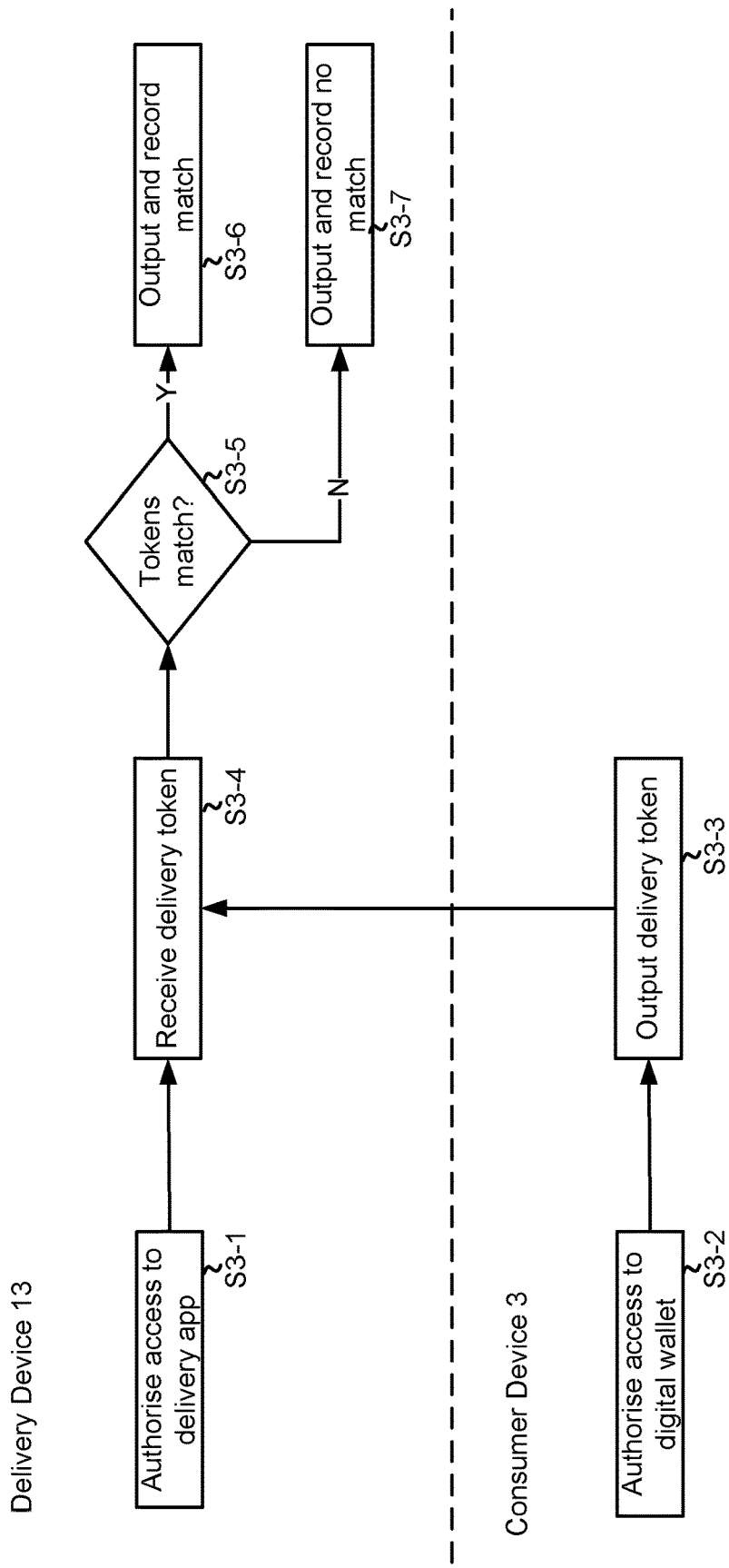
FIG. 3 is a flow diagram of a method of matching delivery tokens in the embodiment.

Methods by which the delivery token 4a stored by the consumer device 3 may be matched with the delivery token 4b stored in delivery device 13 in step S2-7 will now be described with reference to FIG. 3. First, the delivery person arrives at the point of delivery (e.g. the delivery address) with the goods to be delivered and the delivery device 13. At step S3-2, the delivery person is authorised to access the delivery application 13a, for example by entering a passcode. The delivery person may identify to the delivery application 13a the delivery to be made, for example by selecting from a list of deliveries, or by scanning a code on the packaging of the goods to be delivered. Alternatively, the delivery application 13a may rely on the delivery token 4a captured from the consumer device 3 to identify the delivery, or may obtain the delivery token 4b by scanning the code on the packaging. The delivery person then requests the consumer to present the delivery token 4a from the consumer device 3.

At step S3-2, the consumer is authenticated to access the digital wallet 3a, for example by means of a passcode. At step S3-3, the consumer then selects the delivery token for display on the consumer device 3, for example as a one or two-dimensional display code, such as a QR code.

At step S3-4, the delivery person uses the delivery device 13 to scan the delivery token 4a displayed on the consumer device 3. At step S3-5, the delivery application 13a compares the scanned delivery token 4a with the delivery token 4b stored in the delivery application 13a and identified as corresponding to the current delivery. If the tokens match, this is recorded by the delivery application 13a and communicated to the logistics service 23 as previously described. At step S3-6, the delivery application 13a displays or otherwise indicates to the delivery person that the tokens 4a, 4b match, and delivery may therefore proceed. If the tokens 4a, 4b do not match, at step S3-7 the delivery application 13a outputs and stores an indication of the failure and delivery may be refused and the goods returned, or the recipient asked to provide another delivery token 4a.

As an alternative to scanning a displayed code, the delivery token 4a may be passed from the consumer device 3 to the delivery device 13 using near-field communication (NFC), a local connection such as Bluetooth™, audio signals or any other means normally available to mobile devices.

As an alternative to passing the delivery token 4a from the consumer device 3 to the delivery device 13, the delivery token 4b may be passed from the delivery device 13 to the consumer device 3 which then determines whether the delivery tokens 4a, 4b match. The process may then include a step of verifying to the delivery device 13 that the tokens 4a, 4b match, since otherwise the consumer device 3 may be running a dummy application which falsely purports to confirm that the delivery token 4b presented by the delivery device 13 matches a delivery token stored on the consumer device 3. This additional verification step may comprise passing a secure message from the consumer device 3 to the delivery device 13, confirming that the tokens match. The message may be made secure by means of a digital signature, generated for example by a public key of the recipient.

The delivery token 4a may be passed to a device other than the consumer device 3 which was used to authorise payment, for example in circumstances where the intended recipient is not the same party as the purchaser, and/or the intended recipient wishes to delegate receipt of the goods to another party. In one alternative, in step 2-1 the purchaser instructs the merchant system 5 to deliver the purchased goods to another party as intended recipient. At step S2-3, the payment system 7 may send the delivery token 4a to the intended recipient, provided the intended recipient has a consumer device 3 including a digital wallet 3a for storing the delivery token 4a. The token matching process then operates in the same way with delivery to the intended recipient.

Alternatively or additionally, the intended recipient may securely transfer the delivery token 4a to the digital wallet 3a of a delegated recipient, using functionality integrated in the digital wallet 3a. This functionality may include local transfer by display and capture of the delivery token 4a, use of NFC or local connections such as Bluetooth™, or remote transfer via a network connection. The delegated recipient may be identified by a mobile number and/or an address associated with the digital wallet 3a of the delegated recipient.

If the delegated recipient does not have a digital wallet, the delivery token 4a may be sent to the delegated recipient via a communication channel available to the intended recipient, such short message service (SMS), multimedia message service (MMS) or email. This is less secure, since access to the delivery token may not be controlled by authentication. The method of access to the delivery token by the delegated recipient may be reported back to the payment system 7 and/or to the intended recipient. When the delivery is received by the intended recipient from the delegated recipient, the delivery token may be passed to the intended recipient and used to confirm receipt via the digital wallet 3a of the intended recipient to the payment system 7.

Where the delegated recipient is at another address from the intended recipient, the address of the delegated recipient may be sent to the logistics system 23 so that delivery may be made to the delegated recipient. The token matching process then operates in the same way with delivery to the delegated recipient.

Alternatively or additionally, the purchase may be made by a purchaser through another device, such as a desktop or laptop computer, and the delivery token may then be passed to the consumer device 3. The digital wallet 3a may be stored on the desktop or laptop computer. Alternatively, the purchaser need not make the purchase directly by means of the digital wallet 3a, but may use an online account associated with the digital wallet 3a.

In determining whether the delivery tokens 4a, 4b match, it is not essential that they are identical but only that they relate to the same delivery and that this relationship may be verified locally between the delivery device 13 and the consumer device 3, without reference to a remote record.

Mobile Device Details

Figure 4:
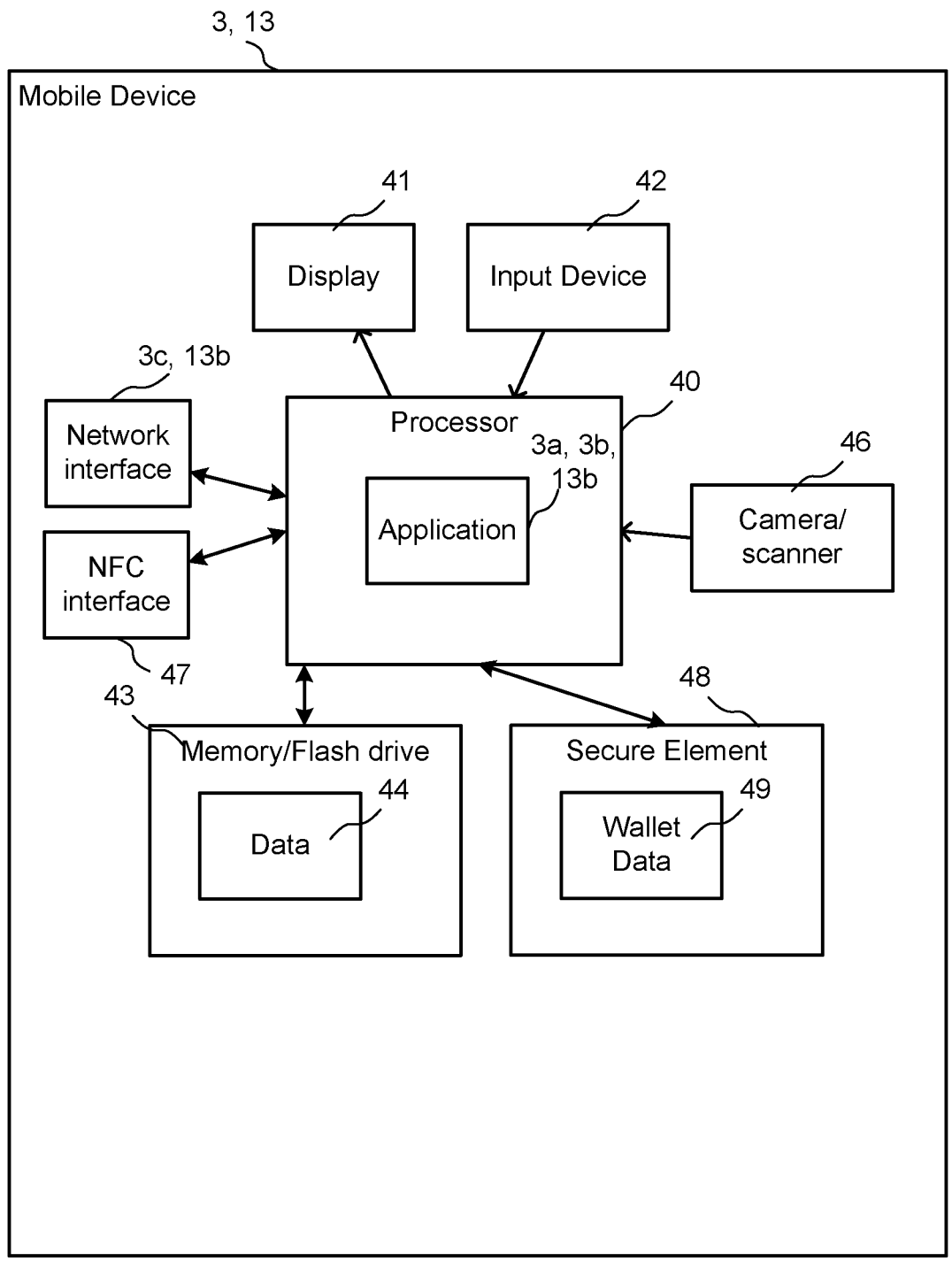
FIG. 4 is a schematic block diagram of a mobile device suitable for use in embodiments of the invention.

FIG. 4 shows further details of one example of a mobile device, such as the consumer device 3 or the delivery device 13. The mobile device comprises at least a processor 40, including for example hardware and an application platform, running one or more applications, such as the digital wallet application 3a, the browser 3b application or the delivery application 13a. The processor 40 is connected to memory or other form of data storage facility such as flash drive 43 storing local data 44, and to a secure element 48 storing wallet data 49 used by the digital wallet application 3a. The application platform may be a mobile operating system such as iOS™, Android™, Blackberry OS, Windows-based OS, or other embedded OS such as Open Embedded Build system, Symbian OS, Contiki, FreeBSD, and TinyOS. The application may comprise program code, which can be loaded or downloaded onto the mobile device.

The mobile device has a display 41 and a manual input device 42, which may be integrated with the display as a touchscreen, and/or provided as a keypad. An alternative or additional input device may be used, such as a trackball, trackpad, motion sensor or mouse. The mobile device may include or be connected to a camera or scanner 46 for capturing optical images and/or codes such as the delivery token.

The mobile device may include a network interface 3c, 13b. The mobile device may also include an NFC interface 47.

Computer Systems

Figure 5:
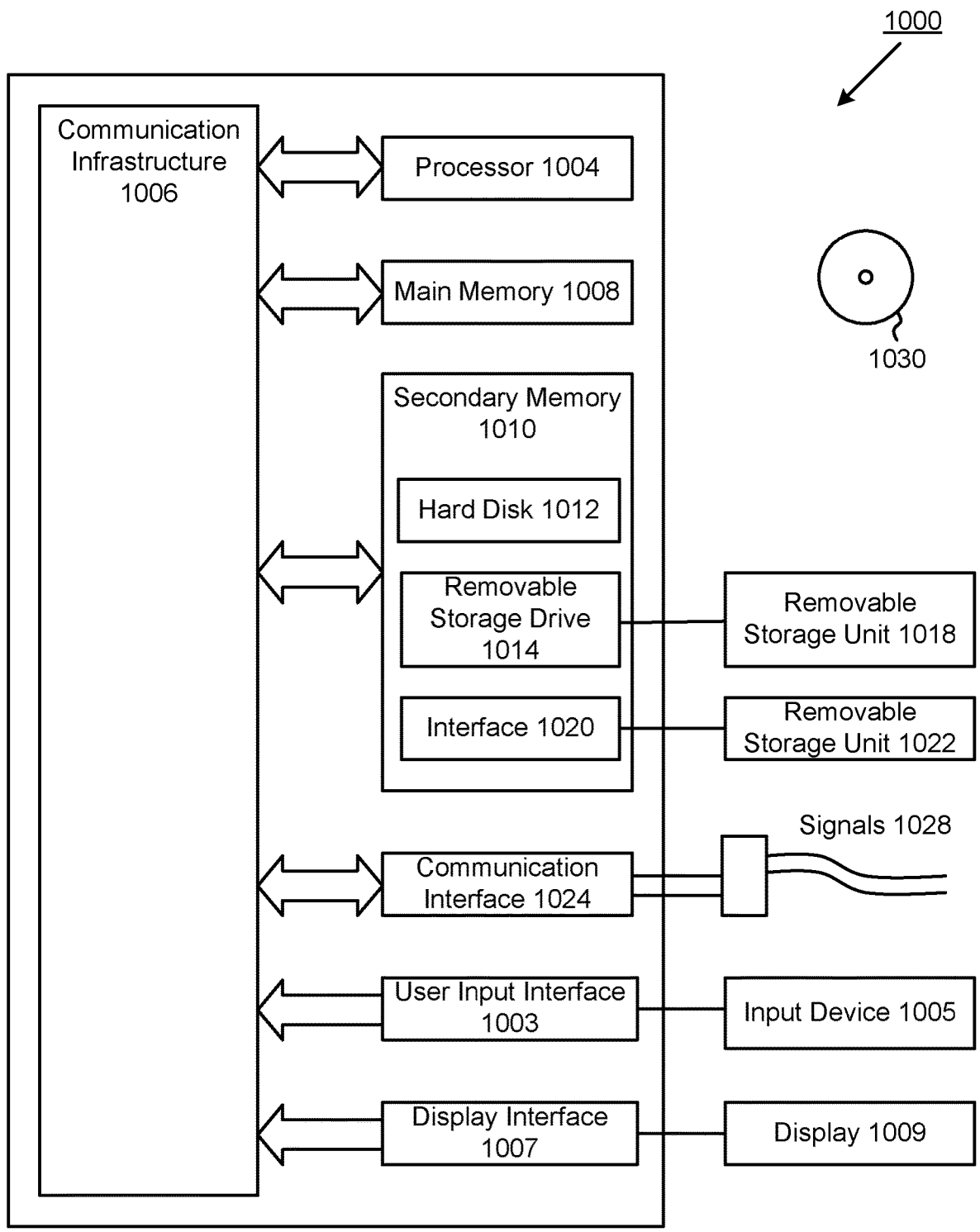
FIG. 5 is a schematic block diagram of a computer system suitable for use in embodiments of the invention.

The entities described herein, such as the merchant system 5, the payment system 7 or the logistics service 23, may be implemented by computer systems such as computer system 1000 as shown in FIG. 5. Embodiments of the present invention may be implemented as programmable code for execution by such computer systems 1000. After reading this description, it will become apparent to a person skilled in the art how to implement the invention using other computer systems and/or computer architectures.

Computer system 1000 includes one or more processors, such as processor 1004. Processor 1004 may be any type of processor, including but not limited to a special purpose or a general-purpose digital signal processor. Processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

Computer system 1000 also includes a user input interface 1003 connected to one or more input device(s) 1005 and a display interface 1007 connected to one or more display(s) 1009. Input devices 1005 may include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using mobile electronic devices with integrated input and display components.

Computer system 1000 also includes a main memory 1008, preferably random access memory (RAM), and may also include a secondary memory 610. Secondary memory 1010 may include, for example, a hard disk drive 1012 and/or a removable storage drive 1014, representing a floppy disk drive, a magnetic tape drive, an optical disk drive, etc. Removable storage drive 1014 reads from and/or writes to a removable storage unit 1018 in a well-known manner. Removable storage unit 1018 represents a floppy disk, magnetic tape, optical disk, etc., which is read by and written to by removable storage drive 1014. As will be appreciated, removable storage unit 618 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that previously found in video game devices), a removable memory chip (such as an EPROM, or PROM, or flash memory) and associated socket, and other removable storage units 1022 and interfaces 1020 which allow software and data to be transferred from removable storage unit 1022 to computer system 1000. Alternatively, the program may be executed and/or the data accessed from the removable storage unit 1022, using the processor 1004 of the computer system 1000.

Computer system 1000 may also include a communication interface 1024. Communication interface 1024 allows software and data to be transferred between computer system 1000 and external devices. Examples of communication interface 1024 may include a modem, a network interface (such as an Ethernet card), a communication port, a Personal Computer Memory Card International Association (PCMCIA) slot and card, etc. Software and data transferred via communication interface 1024 are in the form of signals 1028, which may be electronic, electromagnetic, optical, or other signals capable of being received by communication interface 1024. These signals 1028 are provided to communication interface 1024 via a communication path 1026. Communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as removable storage drive 1014, a hard disk installed in hard disk drive 1012, and signals 1028. These computer program products are means for providing software to computer system 1000. However, these terms may also include signals (such as electrical, optical or electromagnetic signals) that embody the computer program disclosed herein.

Computer programs (also called computer control logic) are stored in main memory 1008 and/or secondary memory 1010. Computer programs may also be received via communication interface 1024. Such computer programs, when executed, enable computer system 1000 to implement embodiments of the present invention as discussed herein. Accordingly, such computer programs represent controllers of computer system 1000. Where the embodiment is implemented using software, the software may be stored in a computer program product 1030 and loaded into computer system 1000 using removable storage drive 1014, hard disk drive 1012, or communication interface 1024, to provide some examples.

Alternative embodiments may be implemented as control logic in hardware, firmware, or software or any combination thereof.

Alternative Embodiments and Modifications

Alternative embodiments may be envisaged, which nevertheless fall within the scope of the following claims.

The invention claimed is:

1. A computer-implemented method of authenticating delivery of a purchase to an authorised recipient, comprising:
   receiving an instruction, by an online payment interface module of a payment system from a recipient device or a purchaser device, indicating an authorized recipient for a purchase;
   responsive to the online payment interface module receiving the instruction, transmitting, by the online payment interface module to a delivery token generator of the payment system, instructions to generate tokens for a delivery authentication;
   generating, by the delivery token generator of the payment system, a first delivery token and a second delivery token;
   transmitting, by the delivery token generator, the first delivery token to the recipient device of the authorized recipient;
   transmitting, by the delivery token generator, the second delivery token to a delivery device of a delivery person;
   instructing, by the delivery token generator, the recipient device to display the first delivery token and the delivery device captures the first delivery token from the recipient device; and
   receiving, by the delivery token generator, a delivery authorization confirmation from the delivery device after determination that the captured first delivery token of the recipient device matches the second delivery token of the delivery device; and based on the determination that the captured first delivery token of the recipient device matches the second delivery token of the delivery device.

2. The method of claim 1, wherein the recipient device is a first recipient device, further comprising delivering the first delivery token to the first recipient device and subsequently transferring the first delivery token by an authenticated user of the first recipient device to a second recipient device.

3. The method of claim 2, wherein transferring the first recipient device to the second recipient device comprises transferring the first delivery token to a digital wallet of the second recipient device.

4. The method of claim 1, wherein authorizing, by the payment system, the purchase includes authorising the purchase by transmitting the first delivery token to a digital wallet on the recipient device, and the first delivery token is stored in the digital wallet.

5. The method of claim 1, including transmitting a message indicating whether delivery of the purchase is authorised.

6. The method of claim 5, further comprising transmitting the message locally at a point of delivery.

7. The method of claim 5, further comprising transmitting the message to a merchant system with which the purchase was authorised.

8. The method of claim 5, further comprising transmitting the message to the recipient device.

9. The method of claim 1, wherein the recipient device comprises a mobile device, and wherein the delivery device comprises a mobile device.

10. The method of claim 1, wherein receiving the instruction indicating the authorized recipient for a purchase comprises receiving the instruction from the purchaser device.

11. The method of claim 1, wherein receiving the instruction indicating the authorized recipient for a purchase comprises receiving the instruction from the recipient device.

12. The method of claim 2, wherein receiving the delivery authorization confirmation comprises receiving a delivery authorization confirmation from the delivery device after determination that the captured first delivery token of the second recipient device matches the second delivery token of the delivery device; and based on the determination that the captured first delivery token of the second recipient device matches the second delivery token of the delivery device.

13. The method of claim 2, further comprising receiving, by the payment system, an identification of a method of access to the first delivery token by the second recipient device.

* * * * *